US012644421B1

(12) United States Patent
Clark et al.

(10) Patent No.: US 12,644,421 B1
(45) Date of Patent: Jun. 2, 2026

(54) SPOOL-TO-SPOOL POWERTRAIN ASSEMBLY FOR AN AIRCRAFT PROPULSION SYSTEM

(71) Applicant: RTX Corporation, Farmington, CT (US)

(72) Inventors: Thomas E. Clark, Wells, ME (US); Murat Yazici, Glastonbury, CT (US); Michael J. Sanca, Jr., Durham, CT (US); Gary Collopy, Vernon, CT (US); Jung Muk Choe, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/337,346

(22) Filed: Sep. 23, 2025

(51) Int. Cl.
| | |
|---|---|
| *F02C 7/36* | (2006.01) |
| *B64D 35/02* | (2006.01) |
| *F02C 6/00* | (2006.01) |
| *F02C 7/32* | (2006.01) |
| *F16H 37/08* | (2006.01) |

(52) U.S. Cl.
CPC .............. *F02C 7/36* (2013.01); *B64D 35/02* (2013.01); *F02C 6/00* (2013.01); *F02C 7/32* (2013.01); *F16H 37/0806* (2013.01)

(58) Field of Classification Search
CPC . B64D 35/02; F02C 3/113; F02C 7/36; F02C 7/32; F16H 37/0806
See application file for complete search history.

(56) References Cited

U.S. PATENT DOCUMENTS

| | | | | |
|---|---|---|---|---|
| 5,694,765 A * | 12/1997 | Hield | ...................... | F02C 3/113 |
| | | | | 60/39.163 |
| 7,168,913 B2 | 1/2007 | Lardellier | | |
| 7,351,174 B2 | 4/2008 | Beutin | | |
| 7,788,898 B2 | 9/2010 | Kern | | |
| 9,045,996 B2 * | 6/2015 | Anghel | ..................... | F02C 7/36 |
| 10,284,125 B2 * | 5/2019 | Armstrong | ............. | F01D 15/10 |
| 10,526,975 B2 | 1/2020 | Howell | | |
| 10,583,931 B2 * | 3/2020 | Cline | ......................... | F02C 6/14 |
| 11,713,720 B2 | 8/2023 | Finke | | |
| 2014/0271117 A1 * | 9/2014 | Armstrong | ............. | F01D 21/12 |
| | | | | 415/13 |
| 2015/0191252 A1 * | 7/2015 | Cline | ......................... | F02C 9/00 |
| | | | | 60/39.24 |
| 2023/0182918 A1 * | 6/2023 | Moore | ...................... | F02K 5/00 |
| | | | | 244/53 R |

* cited by examiner

*Primary Examiner* — Kyle Robert Thomas
(74) *Attorney, Agent, or Firm* — Getz Balich LLC

(57) ABSTRACT

A propulsion system for an aircraft includes a gas turbine engine, an electrical assembly, a powertrain, and a controller. The gas turbine engine includes a rotational structure and a second rotational structure each including a turbine rotor. The electrical assembly includes an electric machine and a control unit. The control unit is electrically connected to the electric machine. The powertrain includes a differential geartrain configured to couple the rotational structure and the second rotational structure together to the electric machine. The controller is connected in communication with the control unit. The controller is configured to maintain a predetermined power transfer ratio between a spool mechanical power transfer of the second rotational structure and an electric machine mechanical power transfer of the electric machine along a rotation speed range of the second rotational structure by controlling an electrical loading of the electric machine with the control unit.

20 Claims, 6 Drawing Sheets

SPOOL-TO-SPOOL POWERTRAIN ASSEMBLY FOR AN AIRCRAFT PROPULSION SYSTEM

BACKGROUND

1. Technical Field

This disclosure relates generally to aircraft propulsion systems and, more particularly, to powertrains for aircraft propulsion systems.

2. Background Information

Various types and configurations of aircraft propulsion systems are known in the art including those with multi-spool gas turbine engines. While these known aircraft propulsion systems have various benefits, there is still room in the art for improvement.

SUMMARY

According to an aspect of the present disclosure, a propulsion system for an aircraft includes a propulsor, a gas turbine engine, an electrical assembly, a powertrain, and a controller. The gas turbine engine includes a first rotational structure and a second rotational structure. Each of the first rotational structure and the second rotational structure includes a turbine rotor. The second rotational structure is coupled to the propulsor. The electrical assembly includes a first electric machine and a first control unit. The first control unit is electrically connected to the first electric machine. The powertrain includes a differential geartrain configured to couple the first rotational structure and the second rotational structure together to the first electric machine. The controller is connected in communication with the first control unit. The controller includes a processor connected in signal communication with a non-transitory memory storing instructions which, when executed by the processor, cause the processor to maintain a predetermined power transfer ratio between a spool mechanical power transfer of the second rotational structure and an electric machine mechanical power transfer of the first electric machine along a rotation speed range of the second rotational structure by controlling an electrical loading of the first electric machine with the first control unit.

In any of the aspects or embodiments described above and herein, maintaining the predetermined power transfer ratio may include maintaining the power transfer ratio within a power transfer ratio range along the rotation speed range of the second rotational structure.

In any of the aspects or embodiments described above and herein, the power transfer ratio range may be greater than or equal to approximately one (1) along the rotation speed range of the second rotational structure.

In any of the aspects or embodiments described above and herein, the power transfer ratio may decrease as a rotation speed of the second rotational structure along the rotation speed range increases.

In any of the aspects or embodiments described above and herein, the power transfer ratio range may be between approximately one (1) and approximately five (5) along the rotation speed range of the second rotational structure.

In any of the aspects or embodiments described above and herein, the power transfer ratio range may be approximately three (3) to approximately five (5) at an idle speed of the second rotational structure and approximately one (1) to approximately three (3) at a redline speed of the second rotational structure.

In any of the aspects or embodiments described above and herein, the predetermined power transfer ratio may be characterized by a first curve segment corresponding to mechanical power transfer from the second rotational structure and mechanical power transfer to the first electric machine and a second curve segment corresponding to mechanical power transfer to the second rotational structure and mechanical power transfer from the first electric machine.

In any of the aspects or embodiments described above and herein, the powertrain may further include a transmission including a spool switching device including a differential mechanical input/output (IO), a high-speed mechanical IO, and an electric machine mechanical IO, the spool switching device may be selectively operable in a differential coupling state in which the differential mechanical IO is coupled with the electric machine mechanical IO and a high-speed coupling state in which the high-speed mechanical IO is coupled with the electric machine mechanical IO, the differential geartrain may couple the first rotational structure and the second rotational structure to the differential mechanical IO, and the first rotational structure may be coupled to the high-speed mechanical IO.

In any of the aspects or embodiments described above and herein, the instructions, when executed by the processor, may further cause the processor to maintain the predetermined power transfer ratio, with the spool switching device in the differential coupling state, by controlling the electrical loading of the first electric machine with the first control unit.

In any of the aspects or embodiments described above and herein, the differential geartrain may include an epicyclic gear assembly including a sun gear, a plurality of planet gears, a planet carrier, and a ring gear, the ring gear may be coupled to the first rotational structure, the planet carrier may be coupled to the second rotational structure, and the sun gear may be operatively coupled with the first electric machine through the powertrain.

In any of the aspects or embodiments described above and herein, the electrical assembly may further include a second electric machine, and the second electric machine may be coupled to the first rotational structure.

In any of the aspects or embodiments described above and herein, the gas turbine engine may further include an accessory gearbox and a plurality of accessory loads, the accessory gearbox may include a gear assembly including the differential geartrain, and the gear assembly may be configured to drive the plurality of accessory loads.

In any of the aspects or embodiments described above and herein, the instructions, when executed by the processor, may further cause the processor to control a mechanical power applied from the second rotational structure to the first rotational structure, with the spool switching device in the first state, by controlling a torque of the first electric machine operating in a generator mode using the first control unit.

In any of the aspects or embodiments described above and herein, the instructions, when executed by the processor, may further cause the processor to increase the mechanical power applied from the second rotational structure to the first rotational structure by controlling the first control unit to increase the torque.

In any of the aspects or embodiments described above and herein, the instructions, when executed by the processor, may further cause the processor to decrease the mechanical power applied from the second rotational structure to the first rotational structure by controlling the first control unit to decrease the torque.

In any of the aspects or embodiments described above and herein, the electrical assembly may further include a second electric machine and a second control unit, the second electric machine may be coupled to the first rotational structure, the second control unit may be connected in signal communication with the controller, the second control unit may be electrically connected to the second electric machine, the instructions, when executed by the processor, may further cause the processor to control a mechanical power applied from the second rotational structure to the first rotational structure, with the spool switching device in the first state, by controlling a torque of the second electric machine operating in a generator mode using the second control unit.

In any of the aspects or embodiments described above and herein, the instructions, when executed by the processor, may further cause the processor to increase the mechanical power applied from the second rotational structure to the first rotational structure by controlling the second control unit to decrease the torque.

In any of the aspects or embodiments described above and herein, the instructions, when executed by the processor, may further cause the processor to decrease the mechanical power applied from the second rotational structure to the first rotational structure by controlling the second control unit to increase the torque.

According to another aspect of the present disclosure, a method of operating a propulsion system for an aircraft, the propulsion system including a gas turbine engine having a first rotational structure and a second rotational structure, an electrical assembly including a first electric machine, and a powertrain including a differential geartrain configured to couple the first rotational structure and the second rotational structure together to the first electric machine, the method including rotating the first rotational structure and the second rotational structure of the gas turbine engine, driving a propulsor of the propulsion system using the second rotational structure, operating the powertrain to mechanically couple the first rotational structure and the second rotational structure together to the first electric machine through the differential geartrain, and maintaining a predetermined power transfer ratio between a spool mechanical power transfer of the second rotational structure and an electric machine mechanical power transfer of the first electric machine along a rotation speed range of the second rotational structure by controlling an electrical loading of the first electric machine with a first control unit electrically connected to the first electric machine.

In any of the aspects or embodiments described above and herein, the method may further include applying mechanical power from the second rotational structure to both of the first rotational structure and the first electric machine while maintaining the predetermined power transfer ratio.

In any of the aspects or embodiments described above and herein, the method may further include applying mechanical power from both of the first rotational structure and the first electric machine to the second rotational structure while maintaining the predetermined power transfer ratio.

In any of the aspects or embodiments described above and herein, maintaining the predetermined power transfer ratio may include maintaining the power transfer ratio within a power transfer ratio range along the rotation speed range of the second rotational structure.

In any of the aspects or embodiments described above and herein, the power transfer ratio range may be greater than or equal to approximately one (1) along the rotation speed range of the second rotational structure.

In any of the aspects or embodiments described above and herein, the power transfer ratio may decrease as a rotation speed of the second rotational structure along the rotation speed range increases.

In any of the aspects or embodiments described above and herein, the power transfer ratio range may be between approximately one (1) and approximately five (5) along the rotation speed range of the second rotational structure.

In any of the aspects or embodiments described above and herein, the power transfer ratio range may be approximately three (3) to approximately five (5) at an idle speed of the second rotational structure and approximately one (1) to approximately three (3) at a redline speed of the second rotational structure.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood; however, the following description and drawings are intended to be exemplary in nature and non-limiting.

DETAILED DESCRIPTION

Figure 1:
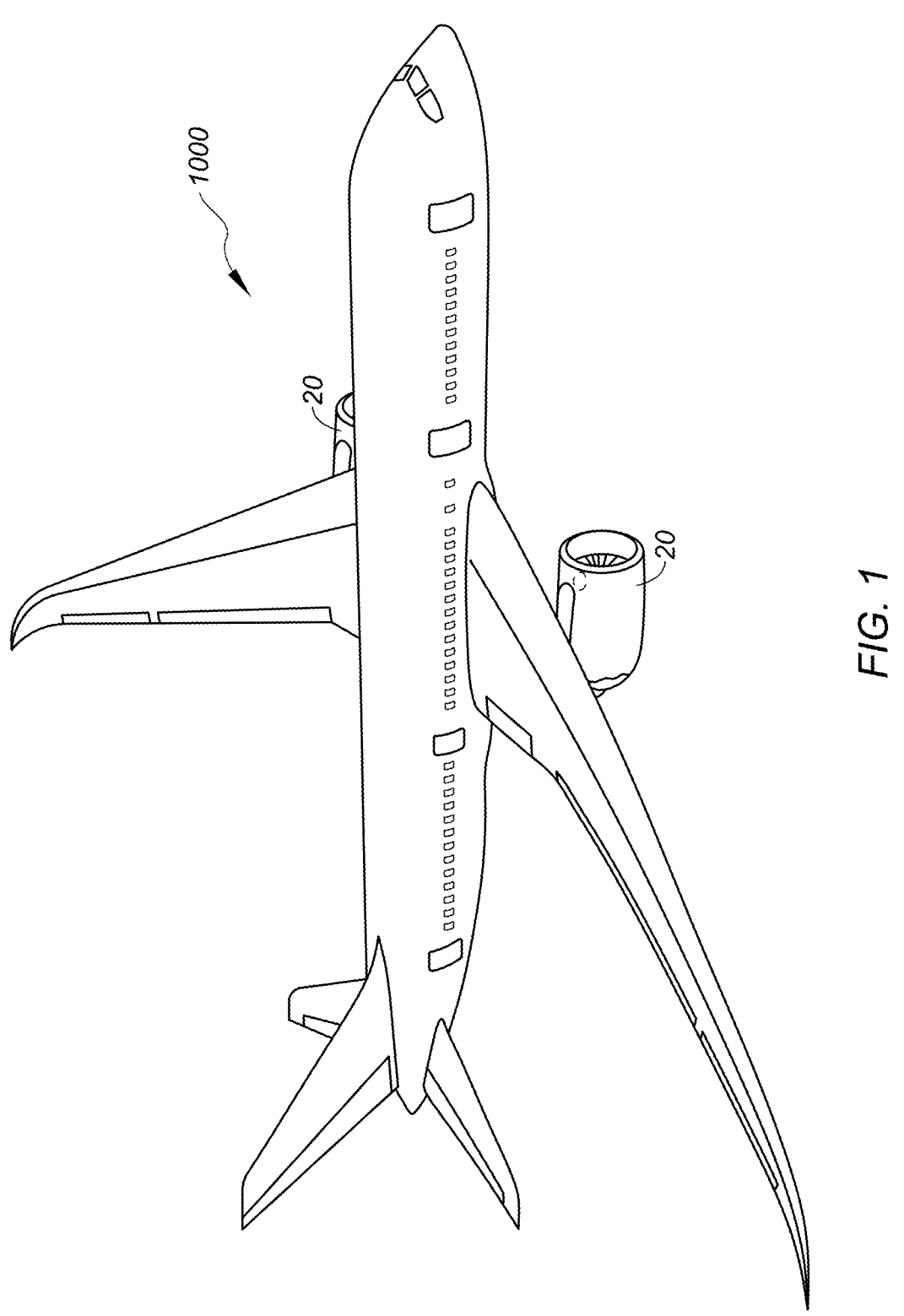
FIG. 1 illustrates a perspective view of an aircraft including a propulsion system, in accordance with one or more embodiments of the present disclosure.
Figure 2:
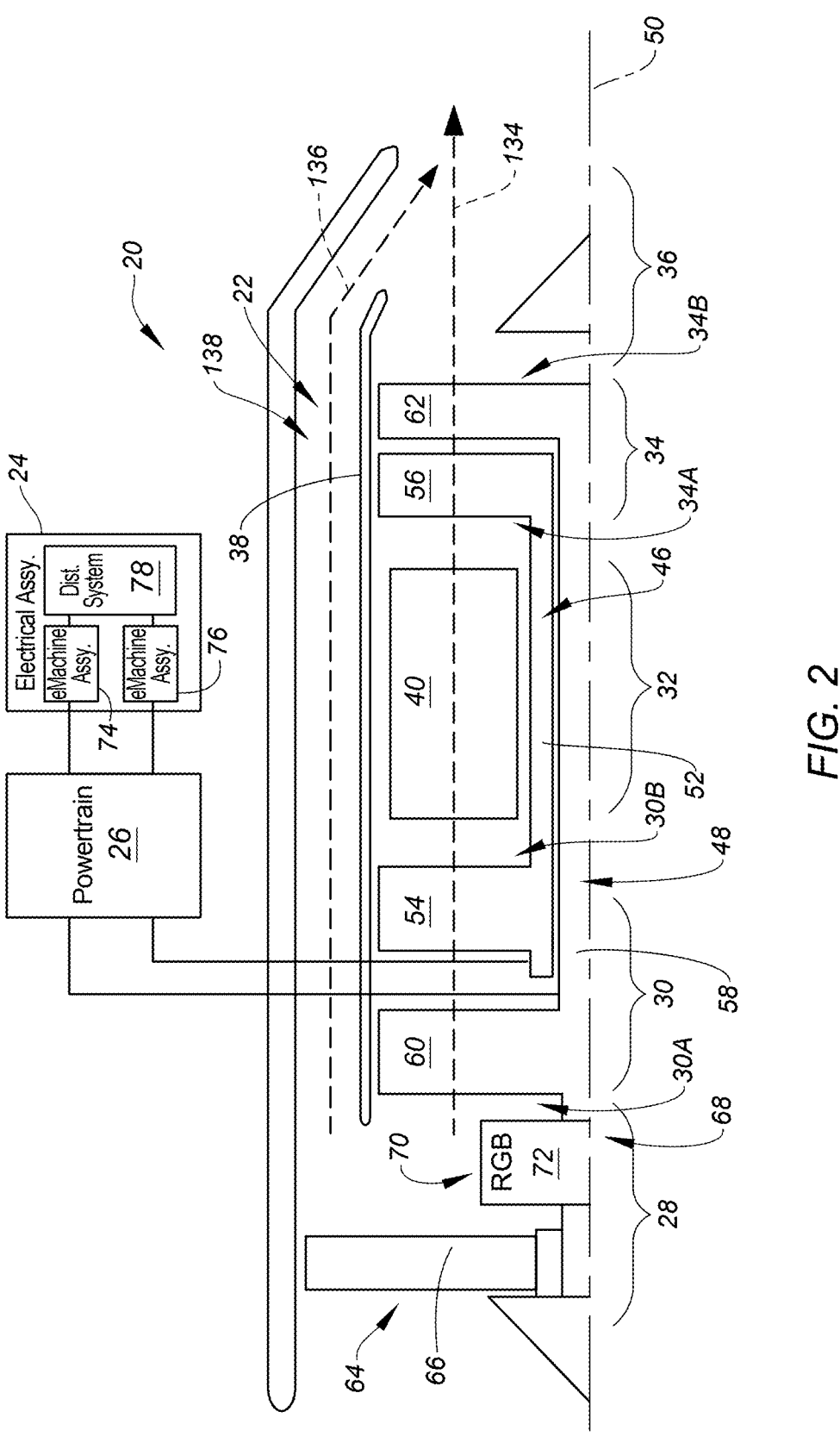
FIG. 2 schematically illustrates an aircraft propulsion system, in accordance with one or more embodiments of the present disclosure.

FIG. 1 illustrates a propulsion system 20 for an aircraft 1000. FIG. 2 schematically illustrates a cutaway, side view of the propulsion system 20. The propulsion system 20 of FIG. 2 is configured as a hybrid-electric propulsion system 20. The propulsion system 20 includes a gas turbine engine 22, an electrical assembly 24, and a powertrain 26.

The gas turbine engine 22 of FIG. 2 is configured as a multi-spool turbofan gas turbine engine. However, while the following description and accompanying drawings may refer to the turbofan gas turbine engine of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, and/or a propfan (e.g., an open rotor) gas turbine engine.

The gas turbine engine 22 of FIG. 2 includes a fan section 28, a compressor section 30, a combustor section 32, a turbine section 34, an exhaust section 36, and an engine static structure 38. The compressor section 30 includes a low-pressure compressor 30A and a high-pressure compressor 30B. The combustor section 32 includes a combustor 40 (e.g., an annular combustor). The turbine section 34 includes a high-pressure turbine 34A and a low-pressure turbine 34B. The compressor section 30, the combustor section 32, and the turbine section 34 may collectively be referred to as an "engine core."

Components of the fan section 28, the compressor section 30, and the turbine section 34 form a first rotational structure 46 (e.g., a high-pressure (HP) spool) and a second rotational structure 48 (e.g., a low-pressure (LP) spool) of the gas turbine engine 22. The first rotational structure 46 and the second rotational structure 48 of FIG. 2 are mounted for rotation about an axis 50 (e.g., a rotational axis and/or an axial centerline) of the gas turbine engine 22 relative to the engine static structure 38. However, the first rotational structure 46 and/or the second rotational structure 48 may alternatively be rotatable about another rotational axis which is (e.g., laterally and/or angularly) offset from the axis 50.

The first rotational structure 46 includes a first shaft 52, a bladed first compressor rotor 54 for the high-pressure compressor 30B, and a bladed first turbine rotor 56 for the high-pressure turbine 34A. The first shaft 52 interconnects the first compressor rotor 54 and the first turbine rotor 56.

The second rotational structure 48 includes a second shaft 58, a bladed second compressor rotor 60 for the low-pressure compressor 30A, and a bladed second turbine rotor 62 for the low-pressure turbine 34B. The second shaft 58 interconnects the second compressor rotor 60 and the second turbine rotor 62. The first shaft 52 and the second shaft 58 are concentric and configured to rotate about the rotational axis 50. The present disclosure, however, is not limited to concentric configurations of the first shaft 52 and the second shaft 58. The gas turbine engine 22 of FIG. 2 is described above with a particular two rotational structure (e.g., spool) arrangement. The present disclosure, however, is not limited to such an exemplary arrangement. For example, the bladed second compressor rotor 60 may be omitted to configure the bladed second turbine rotor 62 as a power turbine (PT) rotor. In another example, the gas turbine engine 22 may additionally include another rotational structure (e.g., an intermediate speed spool) for the engine core.

The second rotational structure 48 is operably coupled to a propulsor 64 of the propulsion system 20. The propulsor 64 of FIG. 2 is configured as a bladed fan rotor 66 for the fan section 28. The second rotational structure 48 (e.g., the second shaft 58) is configured to drive rotation of the propulsor 64 through a drivetrain 68. The drivetrain 68 may be configured as a geared drivetrain, where a geartrain 70 (e.g., a transmission, a speed change device, an epicyclic geartrain, etc.) is disposed between and operatively couples the propulsor 64 to the second rotational structure 48. With this arrangement, the propulsor 64 may rotate at a different (e.g., slower) rotational speed than the second rotational structure 48. The geartrain 70 of FIG. 2 is housed, at least in part, by a gearbox 72 (e.g., a reduction gear box (RGB)). The drivetrain 68 may alternatively be configured as a direct-drive drivetrain, where the geartrain 70 is omitted and the propulsor 64 rotates at a same rotational speed as the second rotational structure 48.

The engine static structure 38 may include one or more engine cases, cowlings, and/or other non-rotating structures configured to house and/or support components of the gas turbine engine 22 sections 30, 32, 34, 36.

Figure 3:
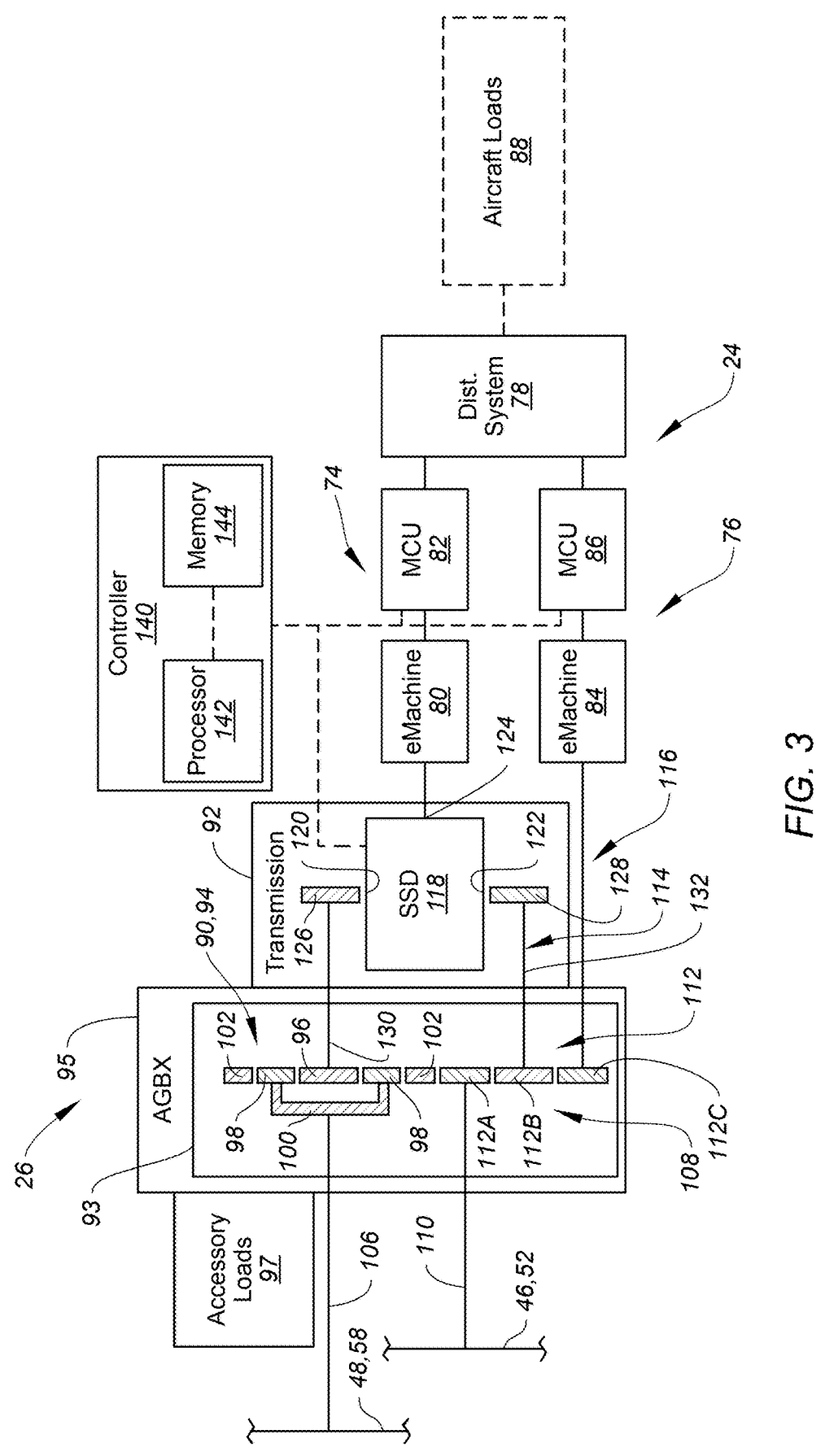
FIG. 3 schematically illustrates an electrical assembly and a powertrain for the aircraft propulsion system, in accordance with one or more embodiments of the present disclosure.

Referring to FIGS. 2 and 3, the electrical assembly 24 includes a first electric machine assembly 74, a second electric machine assembly 76, and an electrical distribution system 78. The electrical assembly 24 may or may not include one or more aircraft energy storage devices (e.g., batteries, capacitors, etc.) electrically connected to the electrical distribution system 78. The first electric machine assembly 74 includes a first electric machine 80 and a first control unit 82 (e.g., a motor control unit, a generator control unit, etc.). The first control unit 82 is electrically connected to and between the first electric machine 80 and the electrical distribution system 78. The second electric machine assembly 76 includes a second electric machine 84 and a second control unit 86 (e.g., a motor control unit, a generator control unit, etc.). The second control unit 86 is electrically connected to and between the second electric machine 84 and the electrical distribution system 78.

Each of the electric machines 80, 84 may be configurable as an electric motor and/or an electric generator (e.g., an electric motor-generator). For example, during a motor mode of operation, the electric machines 80, 84 may operate as the electric motor to convert electricity received from the respective one of the control units 82, 86 to a mechanical power output. By contrast, during a generator mode of operation, the electric machines 80, 84 may operate as the electric generator to convert a mechanical power input received (e.g., through the powertrain 26) into electricity. The electric machines 80, 84 may be configured as integral drive generators (IDGs), variable frequency generators (VFGs), or the like, and the present disclosure is not limited to any particular configuration of the electric machines 80, 84.

Each of the control units 82, 86 is configured to control operation of the respective one of the electric machines 80, 84. For example, when operating as an electric motor, the respective control unit 82, 86 is configured to regulate a flow of electricity from the electrical distribution system 78 to the respective electric machine 80, 84. This electricity flow regulation may include: (a) turning-on the flow of electricity from the electrical distribution system 78 to the respective electric machine 80, 84 (e.g., electrically coupling the respective electric machine 80, 84 to the electrical distribution system 78); (b) turning-off the flow of electricity from the electrical distribution system 78 to the respective electric machine 80, 84 (e.g., electrically decoupling the respective electric machine 80, 84 from the electrical distribution system 78); (c) moderating the flow of electricity from the electrical distribution system 78 to the respective electric machine 80, 84 (e.g., to control a rotation speed and/or torque of the respective electric machine 80, 84). Here, the respective control unit 82, 86 operates as a motor controller. In another example, when operating as an electric generator, the respective control unit 82, 86 is configured to regulate a flow of electricity from the respective electric machine 80, 84 to the electrical distribution system 78. This electricity flow regulation may include: (a) turning-on the flow of electricity from the respective electric machine 80, 84 to the electrical distribution system 78 (e.g., electrically coupling the respective electric machine 80, 84 to the electrical distribution system 78); (b) turning-off the flow of electricity from the respective electric machine 80, 84 to the electrical distribution system 78 (e.g., electrically decoupling the respective electric machine 80, 84 from the electrical distribution system 78); (c) moderating the flow of electricity from the respective electric machine 80, 84 to the electrical distribution system 78. Here, the respective control unit 82, 86 operates as a generator controller.

The electrical distribution system 78 electrically interconnects components of the electrical assembly 24. The electrical distribution system 78 includes alternating current (AC) and/or direct current (DC) buses, switchgear, cables, wires, breakers, switches, contactors, electrical power conditioning and/or conversion (e.g., AC to DC or DC to AC conversion) components, and/or other electrical components to effect the transfer of electrical power between components of the electrical assembly 24. For example, the electrical distribution system 78 is configured to electrically couple the first electric machine 80 and the second electric machine 84. The electrical distribution system 78 may be an electrically distribution system of the aircraft 1000 (see FIG. 1) which may be configured to supply electrical power for aircraft electrical loads 88 of the aircraft 1000 such as, but not limited to, electronic control systems, environmental control systems, lighting systems, communication systems, and the like, as well as to other electrical loads of the propulsion system 20. The electrical distribution system 78 may additionally include one or more electrical power controllers, for example, to control a magnitude and/or direction of electrical current flow to components of the electrical assembly 24. Alternatively, the electrical distribution system 78 may simply electrically interconnect the first control unit 82 and the second control unit 86, and may not be electrically connected to other electrical loads of the aircraft 1000 or its propulsion system 20 (or propulsion systems 20).

The powertrain 26 is configured to mechanically couple the rotational structures 46, 48 of the gas turbine engine 22 with the electric machines 80, 84 of the electrical assembly 24. The powertrain 26 of FIG. 3 includes a differential geartrain 90 and a transmission 92. The differential geartrain 90 may form a portion of a larger gear assembly 93 for the gas turbine engine 22. For example, the gear assembly 93 may be part of an accessory gearbox (AGBX) 95 for the gas turbine engine 22. The accessory gearbox 95 and its gear assembly 93 may be configured to drive operation of one or more accessory loads 97 such as, but not limited to, fuel pumps, hydraulic pumps, oil pumps, wound-field generators, permanent magnet generators, de-oilers, and permanent magnet alternators. The present disclosure, however, is not limited to the foregoing exemplary inclusion of the differential geartrain 90 with the accessory gearbox 95 and its gear assembly 93.

The differential geartrain 90 of FIG. 3 includes an epicyclic gear assembly 94 (e.g., a planetary gearset). The epicyclic gear assembly 94 includes a sun gear 96, a plurality of planet gears 98, a planet carrier 100, and a ring gear 102 arranged along a center axis. The sun gear is disposed on and rotatable about the center axis. The planet gears 98 are arranged about the sun gear 96 as a circumferential array. Each of the planet gears 98 is engaged (e.g., meshed) with the sun gear 96 and configured to revolve about the sun gear 96 and the center axis. Each of the planet gears 98 is rotatably mounted (e.g., about respective rotational axes) on the planet carrier 100. The planet carrier 100 is operatively coupled with the second rotational structure 48 (e.g., the second shaft 58), for example, using a tower shaft 106, as schematically shown in FIG. 3, or by another geared coupling assembly. The ring gear 102 extends circumferentially about (e.g., completely around) the center axis. The ring gear 102 circumscribes the sun gear 96 and the planet gears 98.

The ring gear 102 is engaged (e.g., meshed) with the planet gears 98. The ring gear 102 is rotatable about the center axis. The ring gear 102 is operatively coupled with the first rotational structure 46 (e.g., the first shaft 52). For example, FIG. 3 schematically illustrates the ring gear 102 coupled with the first shaft 52 through, at least in part, a geared coupling assembly 108 and a tower shaft 110. The tower shaft 110 is operatively coupled with the first shaft 52. The geared coupling assembly 108 includes one or more gears 112 directly or indirectly coupled with the tower shaft 110. As shown in FIG. 3, a first gear 112A of the gears 112 may be fixed on the tower shaft 110 and engaged (e.g., meshed) with the ring gear 102. The geared coupling assembly 108 of FIG. 3 further includes a first coupling member 114 and a second coupling member 116. The first coupling member 114 is coupled with and between the tower shaft 110 and the transmission 92. The first coupling member 114 of FIG. 3 includes a second gear 112B of the gears 112. The second coupling member 116 is coupled with and between the tower shaft 110 and the second electric machine 84. The second coupling member 116 of FIG. 3 includes a third gear 112C of the gears 112.

The transmission 92 includes a spool switching device (SSD) 118. The spool switching device 118 includes a differential mechanical input/output (IO) 120, a high-speed mechanical input/output (IO) 122, and an electric machine mechanical input/output (IO) 124. The spool switching device 118 is configurable in a differential coupling state ("Diff. State") or a high-speed coupling state ("HS State"). In the differential coupling state, the spool switching device 118 couples the differential mechanical IO 120 with the electric machine mechanical IO 124. In this differential coupling state, the high-speed mechanical IO 122 is decoupled from the electric machine mechanical IO 124. In the high-speed coupling state, the spool switching device 118 couples the high-speed mechanical IO 122 with the electric machine mechanical IO 124. In this high-speed coupling state, the differential mechanical IO 120 is decoupled from the electric machine mechanical IO 124. The spool switching device 118 may include a sliding clutch or other clutching device operable to selectively configure the spool switching device 118 in its differential coupling state or its high-speed coupling state; however, the present disclosure is not limited to any particular configuration of the spool switching device 118. The differential mechanical IO 120 is coupled with the sun gear 96. The high-speed mechanical IO 122 is coupled with the first coupling member 114. As an example, the transmission 92 of FIG. 3 further includes a first input/output (IO) gear 126 and a second input/output (IO) gear 128. The first IO gear 126 is coupled with the sun gear 96, for example, by a first input/output (IO) shaft 130 interconnecting the sun gear 96 and the first IO gear 126. The first IO gear 126 is further coupled with the spool switching device 118 at the differential mechanical IO 120. The second IO gear 128 forms a portion of the first coupling member 114. The second IO gear 128 is coupled with the second gear 112B, for example, by a second input/output (IO) shaft 132 interconnecting the second gear 112B and the second IO gear 128. The second IO gear 128 is further coupled with the spool switching device 118 at the high-speed mechanical IO 122. The electric machine mechanical IO 124 is coupled with the first electric machine 80.

In operation of the gas turbine engine 22 of FIG. 2, ambient air is directed through the fan section 28 and into a core flow path 134 (e.g., an annular flow path) and a bypass flow path 136 (e.g., an annular flow path) by rotation of the bladed fan rotor 66. Air flow along the core flow path 134 is compressed by the low-pressure compressor 30A and the high-pressure compressor 30B, mixed and burned with fuel in the combustor 40, directed through the high-pressure turbine 34A and the low-pressure turbine 34B, and then exhausted from the propulsion system 20 through the exhaust section 36. The first turbine rotor 56 and the second turbine rotor 62 rotationally drive the first rotational structure 46 and the second rotational structure 48, respectively, in response to the combustion gas flow through the high-pressure turbine 34A and the low-pressure turbine 34B. Air flow along the bypass flow path 136 is directed through propulsion system 20 via an annular bypass duct 138.

During operation of the gas turbine engine 22, one or both of the electric machines 80, 84 may be driven by the first rotational structure 46 and/or the second rotational structure 48, through the powertrain 26, to generate electrical power (e.g., for aircraft electrical loads). Similarly, one or both of the electric machines 80, 84 may operate as an electric motor to apply mechanical power to the first rotational structure 46 and/or the second rotational structure 48, through the powertrain 26. In particular, the present disclosure powertrain 26 facilitates mechanical spool-to-spool power transfer between the first rotational structure 46 and the second rotational structure 48. The transmission 92 may be selectively operated (1) to couple the first rotational structure 46 to the first electric machine 80 (e.g., the high-speed coupling state) or (2) to couple the first rotational structure 46 and the second rotational structure 48 to the first electric machine 80 through the differential geartrain 90 (e.g., the differential coupling state). With the first rotational structure 46 and the second rotational structure 48 coupled to the first electric machine 80, the powertrain 26 and the first electric machine 80 facilitate mechanical power transfer between the first rotational structure 46 and the second rotational structure 48 while the first electric machine 80 operates as an electric generator or an electric motor. The mechanical power split between the rotational structures 46, 48 may be a function of the rotational structures 46, 48 speeds and as well as the torque of the first electric machine 80. Accordingly, mechanical power transfer between the rotational structures 46, 48 may be controlled by controlling the loading of the first electric machine 80 in its motor or generator modes of operation. For example, mechanical power from the second rotational structure 48 may be extracted to the first rotational structure 46 through the differential geartrain 90 while simultaneously driving the first electric machine 80 to generate electrical power. The mechanical power transfer from the second rotational structure 48 to the first rotational structure 46 may be increased by controlling the first electric machine 80, through the first control unit 82, to increase first electric machine torque (e.g., electrical loading).

The present disclosure electrical assembly 24 and powertrain 26 configuration facilitates application of a common gas turbine engine core to a variety of different airframe architectures such that the engine core configuration may be decoupled from considerations of propulsion system electrification, such as conventional gas turbine engines configurations, "more-electric engine" (MEE) configurations, or hybrid-electric gas turbine engine configurations, or the presence or absence of conventional pneumatic systems (e.g., for engine start). The present disclosure may thereby facilitate hybrid-electric functionality (e.g., low-speed spool power extraction, high-speed spool power injection, etc.) for conventional and MEE engine configurations without the need for complex electrification systems or additional motor controllers or high-voltage distribution systems.

Referring to FIG. 3, aspects of the present disclosure electrical assembly 24 and powertrain 26 operation may be implemented using a controller 140. The controller 140 may be a "shared controller" dedicated to perform other functionality as well as the functionality described herein. Non-limiting examples of a "shared controller" include an electronic engine control (EEC), a full-authority digital engine control (FADEC), or an aircraft control system. Regardless of whether a dedicated controller or a "shared controller" is used, the controller 140 is connected in communication with the first control unit 82 and the second control unit 86 to facilitate the functions described herein. The controller 140 may additionally be connected in communication with the spool switching device 118 to control operation of the spool switching device 118 in its high-speed coupling state or its differential coupling state. The controller 140 includes a processor 142 connected in signal communication with memory 144 storing instructions which, when executed, cause the controller 140 and/or the processor 142 to execute, control, monitor, or otherwise facilitate the functions of the electrical assembly 24 and the powertrain 26 described herein. The processor 142 may include one or more of any type of computing device, computational circuit, processor(s), CPU, computer, or the like capable of executing a series of instructions that are stored in the memory 144. The instructions may include an operating system, and/or executable software modules such as program files, system data, buffers, drivers, utilities, and the like. The executable instructions may apply to any functionality described herein to enable the propulsion system 20 to accomplish the same algorithmically and/or coordination of system components. The controller 140 includes or is otherwise connected in communication with the memory 144. The present disclosure is not limited to any particular type of memory 144, and the memory 144 may store instructions and/or data in a non-transitory manner. Examples of the memory 144 may include read-only memory, random access memory, volatile memory, non-volatile memory, static memory, dynamic memory, flash memory, cache memory, and/or any device that stores digital information. The controller 140 may include, or may be in communication with, an input device (not shown) that enables a user to enter data and/or instructions, and may include, or be in communication with, an output device configured, for example to display information (e.g., a visual display, or the like), or to transfer data, etc. Communications between the controller 140 and other system components may be via a hardwire connection or via a wireless connection.

The electrical assembly 24 (e.g., the electric machines 80, 84) and the powertrain 26 may be selectively operated (e.g., by the controller 140) to facilitate mechanical power transfer between the rotational structures 46, 48 and the electric machines 80, 84. The spool switching device 118 may be selectively controlled (e.g., by the controller 140) to operate in its differential coupling state or its high-speed coupling state over a range of different aircraft 1000 (see FIG. 1) and propulsion system 20 (see FIGS. 2 and 3) operating conditions to facilitate optimal spool-to-spool power sharing (e.g., between the rotational structures 46, 48) and electrical power generation (e.g., by the electric machines 80, 84). In each of these differential coupling states or high-speed coupling states, the electric machines 80, 84 may be controlled (e.g., by the controller 140) to facilitate electrical power generation (e.g., mechanical power extraction), spool-to-spool power transfer (e.g., from the second rotational structure 48 to the first rotational structure 46), and/or first rotational assembly 46 mechanical power injection in a motor mode of operation.

Figure 4:
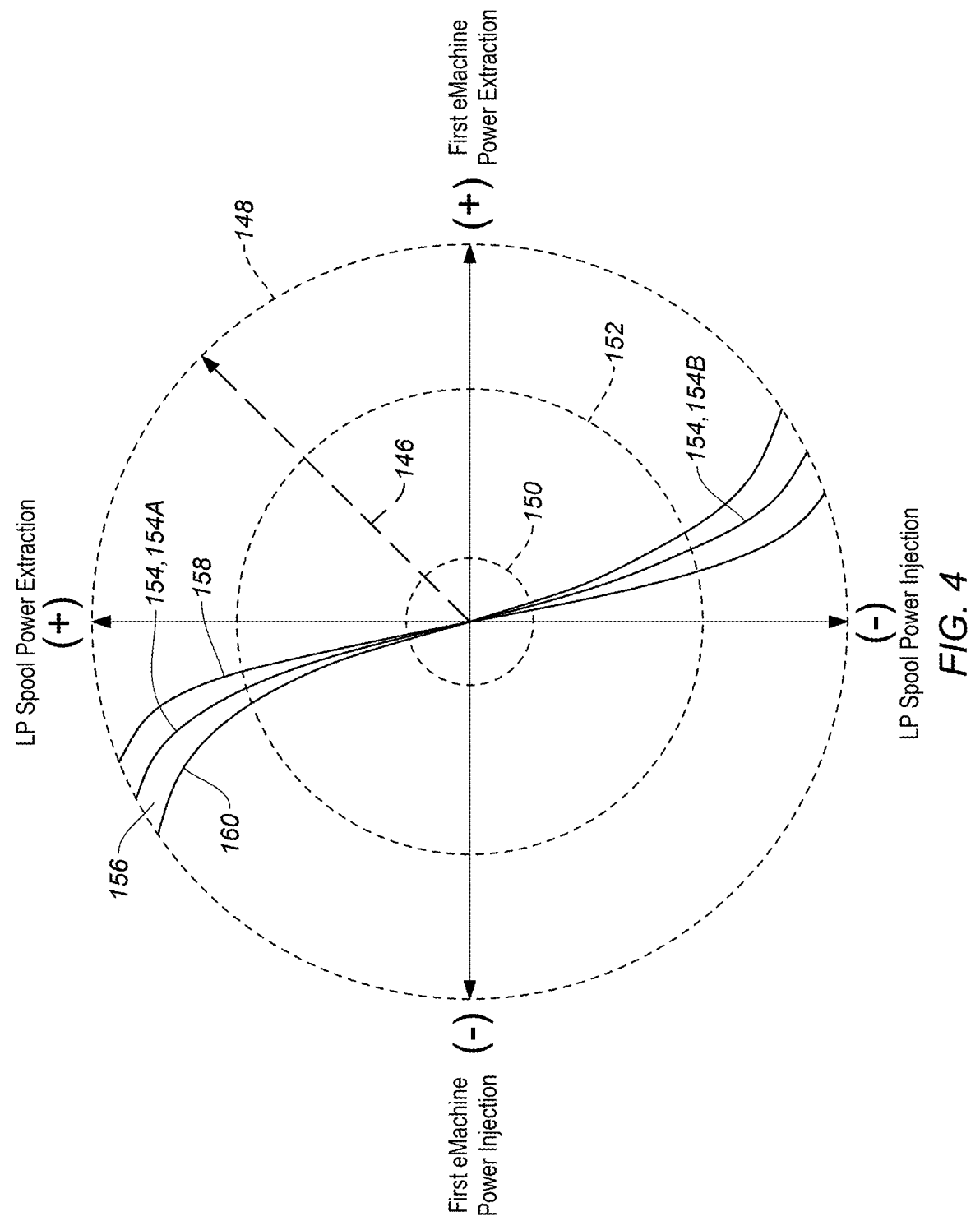
FIG. 4 diagrammatically illustrates a hybrid-electric power transfer architecture, in accordance with one or more embodiments of the present disclosure.

As an example of the foregoing mechanical power transfer arrangement of the present disclosure, FIG. 4 diagrammatically illustrates a hybrid-electric power transfer architecture for transferring mechanical power to the second rotational structure 48 (e.g., low-pressure (LP) spool power injection) and transferring mechanical power from the second rotational structure 48 (e.g., e.g., LP spool power extraction) with the spool switching device 118 in its differential coupling state. Characteristics of the hybrid-electric power transfer architecture are shown relative to a rotation speed 146 of the second rotational structure 48 (an N1 speed 146) which increases in a radial direction from a center (e.g., 0 speed) to an N1 redline speed 148 (e.g., a maximum N1 design speed). FIG. 4 further illustrates an N1 idle speed 150 and an N1 intermediate speed 152 between the N1 idle speed 150 and the N1 redline speed 148. Mechanical power transfer of the second rotational structure 48 is shown along a Y-axis of FIG. 4 with mechanical power transfer from the second rotational structure 48 (e.g., power extraction) shown as positive mechanical power transfer and mechanical power transfer to the second rotational structure 48 (e.g., power injection) shown as negative mechanical power transfer. Mechanical power transfer of the first electric machine 80 is shown along an X-axis of FIG. 4 with mechanical power transfer from the first electric machine 80 (e.g., power extraction) shown as positive mechanical power transfer and mechanical power transfer to the first electric machine 80 (e.g., power injection) shown as negative mechanical power transfer. The controller 140 may control the first control unit 82 to control an electrical loading of the first electric machine 80, in its motor mode or generator mode, to facilitate control of the mechanical power transfer to or from the second rotational structure 48 and the magnitude thereof. The differential geartrain 90 operates as a power multiplier relative to the first electric machine 80, facilitating greater magnitudes of spool-to-spool power transfer than what the electrical assembly 24 alone may provide. This configuration facilitates power augmentation for mechanical power injection and/or mechanical power extraction of the second rotational structure 48 (e.g., a low-pressure spool). For example, the differential geartrain 90 may facilitate a 4× or greater power factor to fan thrust (e.g., 100 horsepower (HP) electrical machine injection resulting in 400 HP of fan power augmentation) for the propulsion system 20.

In operation, the controller 140 may operate to maintain a predetermined power transfer ratio between a spool mechanical power transfer of the second rotational structure 48 and an electric machine mechanical power transfer of the first electric machine 80 along a range of the N1 speed 146. The controller 140 may maintain the power transfer ratio, at least in part, by controlling an electrical loading of the first electric machine 80, in its motor mode or generator mode, through the control unit 82. The power transfer ratio is expressed as a ratio of the spool mechanical power transfer to the electric machine mechanical power transfer. The controller 140 may control the power transfer ratio along a power transfer curve 154, as shown in FIG. 4. Power transfer ratios of the power transfer curve 154 vary along the range of the N1 speed 146, and so the controller 140 may facilitate control of the power transfer ratio based on the current N1 speed 146. For example, the controller 140 may control the electrical loading of the first electric machine 80 in response to a measured N1 speed 146 signal for the second rotational structure 48. As can be understood from FIG. 4, the power transfer curve 154 may be characteristics by a first curve segment 154A corresponding to LP spool power extraction and first electric machine power injection and a second curve segment 154B corresponding to LP spool power injection and first electric machine power extraction.

The power transfer ratio of the power transfer curve 154 may be greater than or equal to 1 along the N1 speed 146 range between the N1 idle speed 150 and the N1 redline speed 148 or along all or substantially all of the N1 speed 146 range. The power transfer ratio of the power transfer curve 154 may vary with N1 speed 146 as noted above, for example, between a power transfer ratio of approximately one (1) and a power transfer ratio of approximately five (5). The power transfer ratio of the power transfer curve 154 may decrease (e.g., exponentially decrease) as the N1 speed 146 increases, for example, from the N1 idle speed 150 to the N1 redline speed 148. The controller 140 may operate to maintain the power transfer ratio within a power transfer ratio range 156 of the power transfer curve 154, which power transfer ratio range 156 may be characterized by a ratio maximum 158 and a ratio minimum 160. Like the power transfer ratio values of the power transfer curve 154, the power transfer ratio range 156 values may vary with N1 speed 146. For example, the power transfer ratio range 156 may be approximately three (3) to approximately five (5) at the N1 idle speed 150, approximately two (2) to approximately five (5) at the N1 intermediate speed 152, and/or approximately one (1) to approximately three (3) at the N1 redline speed 148.

Figure 5:
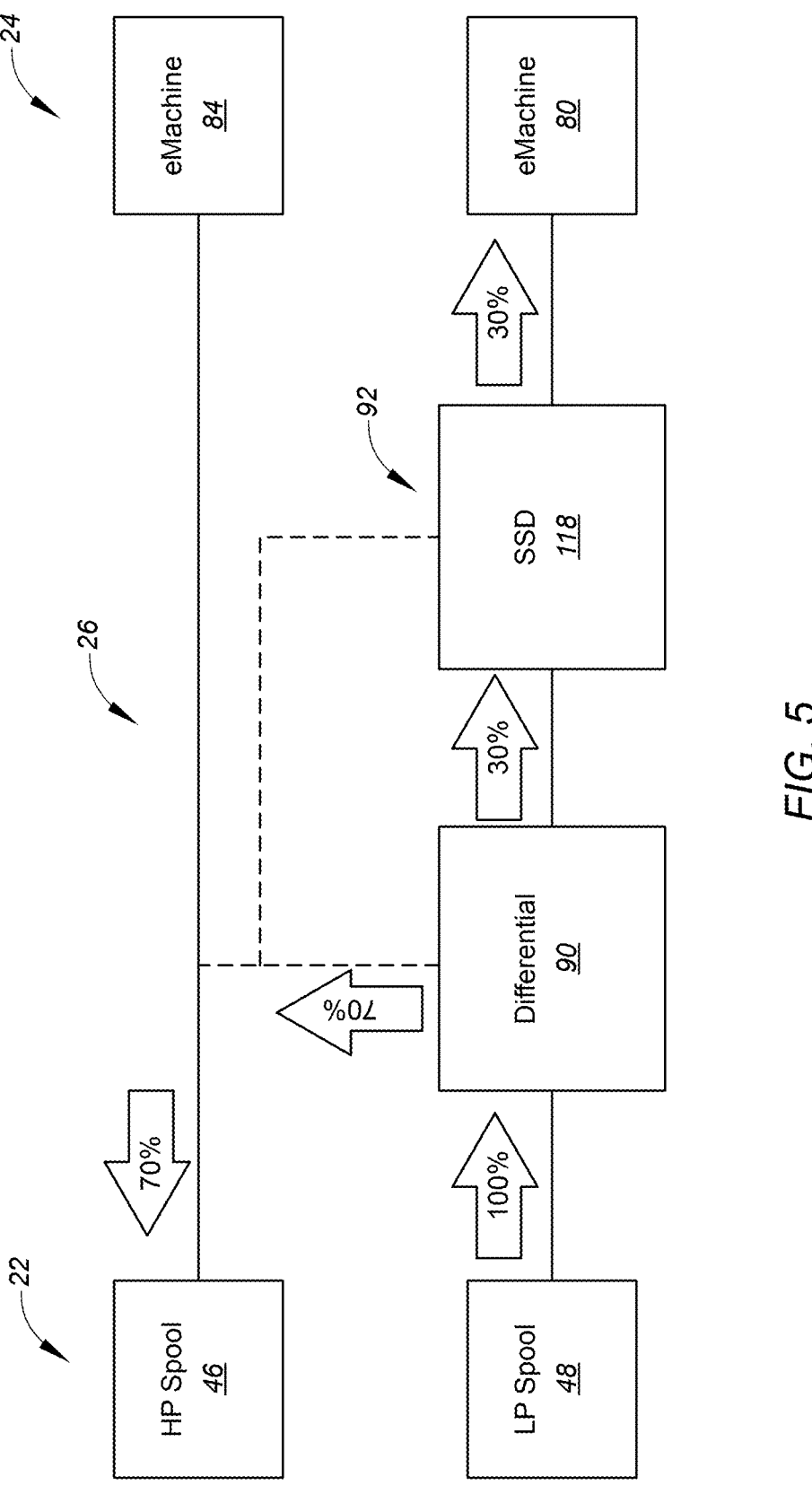
FIG. 5 schematically illustrates an exemplary operating state of the aircraft propulsion system, in accordance with one or more embodiments of the present disclosure.
Figure 6:
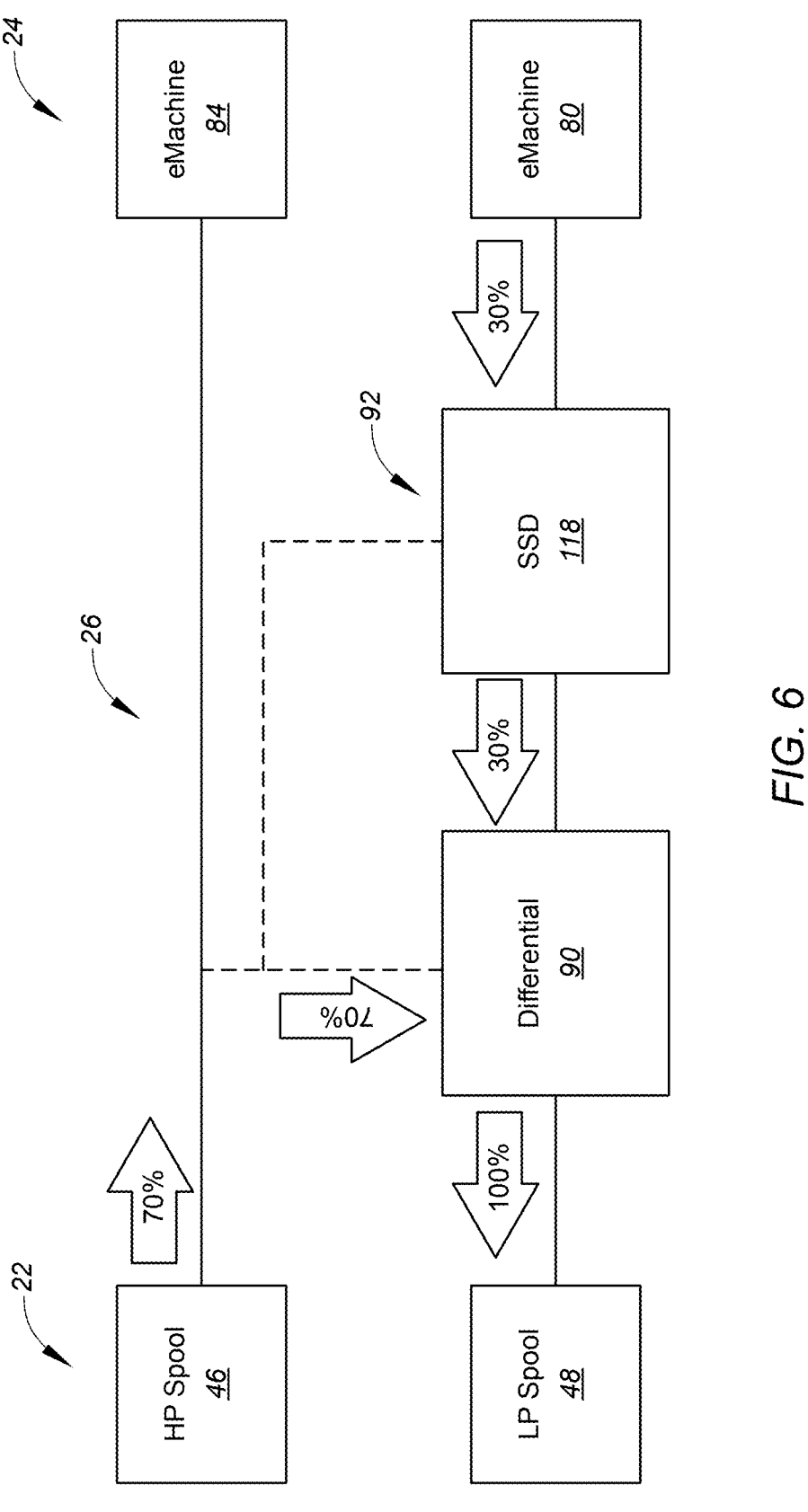
FIG. 6 schematically illustrates another exemplary operating state of the aircraft propulsion system, in accordance with one or more embodiments of the present disclosure.

FIGS. 5-6 schematically illustrate different exemplary operating states of the gas turbine engine 22, the electrical assembly 24, and the powertrain 26. The FIGS. 5-6 illustrate various proportions of mechanical power transfer between the components of the gas turbine engine 22, the electrical assembly 24, and the powertrain 26. These proportions are included to facilitate understanding of the present disclosure, and the present disclosure is not limited to particular values of these mechanical power transfer proportions.

Referring to FIGS. 3, 4, and 5, in a first example, mechanical power from the second rotational structure 48 may be extracted, through the powertrain 26 and its differential geartrain 90, to drive the first electric machine 80 and to apply (e.g., inject) mechanical power to the first rotational structure 46. For example, mechanical power from the second rotational structure 48 may be extracted to facilitate an acceleration flight condition (e.g., idle to high-power acceleration) by applying mechanical power to the first rotational structure 46. The spool switching device 118 may be operated in its differential coupling state to couple the first rotational structure 46 and the second rotational structure 48 to the first electric machine 80. A first portion (e.g., 30 percent) of the mechanical power extracted from the second rotational structure 48 may be applied to the first electric machine 80 through the differential geartrain 90 and the transmission 92 while a second portion (e.g., 70 percent) of the mechanical power extracted from the second rotational structure 48 may be applied to the first rotational structure 46 through the differential geartrain 90 and the geared coupling assembly 108. The electrical loading (e.g., torque) of the first electric machine 80 may be controlled by the controller 140, through the first control unit 82, to control the amount of mechanical power extracted from the second rotational structure 48 and injected to the first electric machine 80, for example, within the power transfer ratio range 156.

Referring to FIGS. 3, 4, and 6, in a second example, mechanical power from the first rotational structure 46 and the first electric machine 80 may be extracted, through the powertrain 26 and its differential geartrain 90, to apply (e.g., inject) mechanical power to the second rotational structure 48. For example, mechanical power from the first rotational structure 46 and the first electric machine 80 may be extracted to facilitate a takeoff flight phase or step climb phase by applying mechanical power to the second rotational structure 48, and thereby providing fan thrust augmentation. The spool switching device 118 may be operated in its differential coupling state to couple the first rotational structure 46 and the second rotational structure 48 to the first electric machine 80. A first portion (e.g., 30 percent) of the mechanical power injected to the second rotational structure 48 may be transferred from the first electric machine 80 through the differential geartrain 90 and the transmission 92 while a second portion (e.g., 70 percent) of the mechanical power injected to the second rotational structure 48 may be transferred from the first rotational structure 46 through the differential geartrain 90 and the geared coupling assembly 108. The electrical loading (e.g., torque) of the first electric machine 80 may be controlled by the controller 140, through the first control unit 82, to control the amount of mechanical power injected to the second rotational structure 48 and extracted from the first electric machine 80, for example, within the power transfer ratio range 156.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A propulsion system for an aircraft, the propulsion system comprising:
    a propulsor;
    a gas turbine engine comprising a first rotational structure and a second rotational structure, each of the first rotational structure and the second rotational structure comprising a turbine rotor, the second rotational structure coupled to the propulsor;
    an electrical assembly comprising a first electric machine and a first control unit, the first control unit electrically connected to the first electric machine;
    a powertrain comprising a differential geartrain configured to couple the first rotational structure and the second rotational structure together to the first electric machine; and
    a controller connected in communication with the first control unit, the controller comprising a processor connected in signal communication with a non-transitory memory storing instructions which, when executed by the processor, cause the processor to:

maintain a predetermined power transfer ratio between a spool mechanical power transfer of the second rotational structure and an electric machine mechanical power transfer of the first electric machine along a rotation speed range of the second rotational structure by controlling an electrical loading of the first electric machine with the first control unit.

2. The propulsion system of claim 1, wherein maintaining the predetermined power transfer ratio includes maintaining the power transfer ratio within a power transfer ratio range along the rotation speed range of the second rotational structure.

3. The propulsion system of claim 2, wherein the power transfer ratio range is greater than or equal to approximately one (1) along the rotation speed range of the second rotational structure.

4. The propulsion system of claim 2, wherein the power transfer ratio decreases as a rotation speed of the second rotational structure along the rotation speed range increases.

5. The propulsion system of claim 2, wherein the power transfer ratio range is between approximately one (1) and approximately five (5) along the rotation speed range of the second rotational structure.

6. The propulsion system of claim 5, wherein the power transfer ratio range is approximately three (3) to approximately five (5) at an idle speed of the second rotational structure and approximately one (1) to approximately three (3) at a redline speed of the second rotational structure.

7. The propulsion system of claim 2, wherein the predetermined power transfer ratio is characterized by a first curve segment corresponding to mechanical power transfer from the second rotational structure and mechanical power transfer to the first electric machine and a second curve segment corresponding to mechanical power transfer to the second rotational structure and mechanical power transfer from the first electric machine.

8. The propulsion system of claim 1, wherein the powertrain further comprises a transmission including a spool switching device comprising a differential mechanical input/output (IO), a high-speed mechanical IO, and an electric machine mechanical IO, the spool switching device selectively operable in a differential coupling state in which the differential mechanical IO is coupled with the electric machine mechanical IO and a high-speed coupling state in which the high-speed mechanical IO is coupled with the electric machine mechanical IO, the differential geartrain couples the first rotational structure and the second rotational structure to the differential mechanical IO and the first rotational structure is coupled to the high-speed mechanical IO.

9. The propulsion system of claim 8, wherein the instructions, when executed by the processor, further cause the processor to maintain the predetermined power transfer ratio, with the spool switching device in the differential coupling state, by controlling the electrical loading of the first electric machine with the first control unit.

10. The propulsion system of claim 1, wherein the differential geartrain comprises an epicyclic gear assembly including a sun gear, a plurality of planet gears, a planet carrier, and a ring gear, the ring gear is coupled to the first rotational structure, the planet carrier is coupled to the second rotational structure, and the sun gear is operatively coupled with the first electric machine through the powertrain.

11. The propulsion system of claim 1, wherein the electrical assembly further comprises a second electric machine, and the second electric machine is coupled to the first rotational structure.

12. The propulsion system of claim 1, wherein the gas turbine engine further comprises an accessory gearbox and a plurality of accessory loads, the accessory gearbox comprises a gear assembly comprising the differential geartrain, and the gear assembly is configured to drive the plurality of accessory loads.

13. A method of operating a propulsion system for an aircraft, the propulsion system comprising a gas turbine engine having a first rotational structure and a second rotational structure, an electrical assembly comprising a first electric machine, and a powertrain comprising a differential geartrain configured to couple the first rotational structure and the second rotational structure together to the first electric machine, the method comprising:

rotating the first rotational structure and the second rotational structure of the gas turbine engine;

driving a propulsor of the propulsion system using the second rotational structure;

operating the powertrain to mechanically couple the first rotational structure and the second rotational structure together to the first electric machine through the differential geartrain; and maintaining a predetermined power transfer ratio between a spool mechanical power transfer of the second rotational structure and an electric machine mechanical power transfer of the first electric machine along a rotation speed range of the second rotational structure by controlling an electrical loading of the first electric machine with a first control unit electrically connected to the first electric machine.

14. The method of claim 13, further comprising applying mechanical power from the second rotational structure to both of the first rotational structure and the first electric machine while maintaining the predetermined power transfer ratio.

15. The method of claim 13, further comprising applying mechanical power from both of the first rotational structure and the first electric machine to the second rotational structure while maintaining the predetermined power transfer ratio.

16. The method of claim 13, wherein maintaining the predetermined power transfer ratio includes maintaining the power transfer ratio within a power transfer ratio range along the rotation speed range of the second rotational structure.

17. The method of claim 16, wherein the power transfer ratio range is greater than or equal to approximately one (1) along the rotation speed range of the second rotational structure.

18. The method of claim 16, wherein the power transfer ratio decreases as a rotation speed of the second rotational structure along the rotation speed range increases.

19. The method of claim 16, wherein the power transfer ratio range is between approximately one (1) and approximately five (5) along the rotation speed range of the second rotational structure.

20. The method of claim 19, wherein the power transfer ratio range is approximately three (3) to approximately five (5) at an idle speed of the second rotational structure and approximately one (1) to approximately three (3) at a redline speed of the second rotational structure.

* * * * *